(12) United States Patent
Carlos

(10) Patent No.: US 7,536,677 B2
(45) Date of Patent: May 19, 2009

(54) METHOD, SYSTEM, AND PRODUCT FOR DETERMINING DEFECT DETECTION EFFICIENCY

(75) Inventor: Cohan Sujay Carlos, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 674 days.

(21) Appl. No.: 10/742,255

(22) Filed: Dec. 19, 2003

(65) Prior Publication Data

US 2005/0216796 A1 Sep. 29, 2005

(51) Int. Cl.
*G06F 9/44* (2006.01)
*G06K 5/04* (2006.01)
*G06F 12/00* (2006.01)

(52) U.S. Cl. .................. 717/121; 717/168; 714/699; 707/203

(58) Field of Classification Search .................. 717/121
See application file for complete search history.

(56) References Cited

U.S. PATENT DOCUMENTS

| 5,047,928 A | 9/1991 | Wiedemer | 364/406 |
|---|---|---|---|
| 5,155,680 A | 10/1992 | Wiedemer | 364/406 |
| 5,703,788 A | 12/1997 | Shei et al. | 364/488 |
| 5,745,884 A | 4/1998 | Carnegie et al. | 705/34 |
| 5,852,812 A | 12/1998 | Reeder | 705/39 |
| 5,893,077 A | 4/1999 | Griffin | 705/34 |
| 5,903,897 A * | 5/1999 | Carrier et al. | 707/203 |
| 6,003,042 A * | 12/1999 | Melahn | 707/203 |
| 6,061,436 A | 5/2000 | Bauer et al. | 379/114 |
| 6,208,977 B1 | 3/2001 | Hernandez et al. | 705/34 |
| 6,223,221 B1 | 4/2001 | Kunz | 709/224 |
| 6,256,773 B1 * | 7/2001 | Bowman-Amuah | 717/121 |
| 6,272,678 B1 * | 8/2001 | Imachi et al. | 717/122 |
| 6,336,217 B1 * | 1/2002 | D'Anjou et al. | 717/121 |
| 6,938,240 B2 * | 8/2005 | Charisius et al. | 717/104 |

OTHER PUBLICATIONS

Mockus et al., Understanding and Predicting Effort in Software Projects, May 3, 2003, ACM.*
Palma et al., Collecting Data for Software Reliability Analysis and Modeling, Oct. 1993, IBM Press.*

* cited by examiner

*Primary Examiner*—Eric B Kiss
*Assistant Examiner*—Ben C Wang
(74) *Attorney, Agent, or Firm*—Yee & Associates, P.C.; Martin J. McKinley

(57) ABSTRACT

A method, system, and computer program product are disclosed in a data processing system for determining defect detection efficiency. Code development steps are tracked using a repository while code is being developed. The tracked development steps are used to determine an earliest first time when a defect could have been discovered. An actual second time when the defect was discovered is determined. The efficiency of defect detection is determined by comparing the time elapsed between the first and second times.

2 Claims, 3 Drawing Sheets

METHOD, SYSTEM, AND PRODUCT FOR DETERMINING DEFECT DETECTION EFFICIENCY

BACKGROUND OF THE INVENTION

1. Technical Field

The present invention relates generally to an improved data processing system, and in particular to a method, system, and product for determining the efficiency of detecting defects in code.

2. Description of Related Art

Occasionally during the development of software, also called code, defects are inadvertently created in the code. A programmer is typically unaware that this has happened. Thus, the programmer is also unaware of exactly when the defect entered the code.

The sooner a defect is found, the easier and thus less expensive it is to fix. This is because additional code is typically created over time. This additional code may inadvertently inherit the defect or may depend on the code that included the defect thus exacerbating the effect of the defect on the performance of the code. Over time, the defect will affect more and more files of code. As another reason, as time passes it becomes more difficult to fix the defect because the programmer has more difficulty remembering what changes were made that might have caused the defect.

Therefore, the effectiveness of a test and development team of programmers may be judged by determining how effective the team is at locating and fixing defects. In order to determine how effective the team is at locating defects, it is necessary to know both when the defect was discovered as well as when the defect entered the code. However, it is very difficult to determine exactly when a defect entered the code. The actual time the defect entered the code cannot be known with absolute certainty because a programmer does not know when a defect enters the code.

Therefore, a need exists for a method, system, and product for determining the efficiency of detecting defects in code.

SUMMARY OF THE INVENTION

A method, system, and computer program product are disclosed in a data processing system for determining defect detection efficiency. Code development steps are tracked using a repository while code is being developed. The tracked development steps are used to determine an earliest first time when a defect could have been discovered. An actual second time when the defect was discovered is determined. The efficiency of defect detection is determined by comparing the time elapsed between the first and second times.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
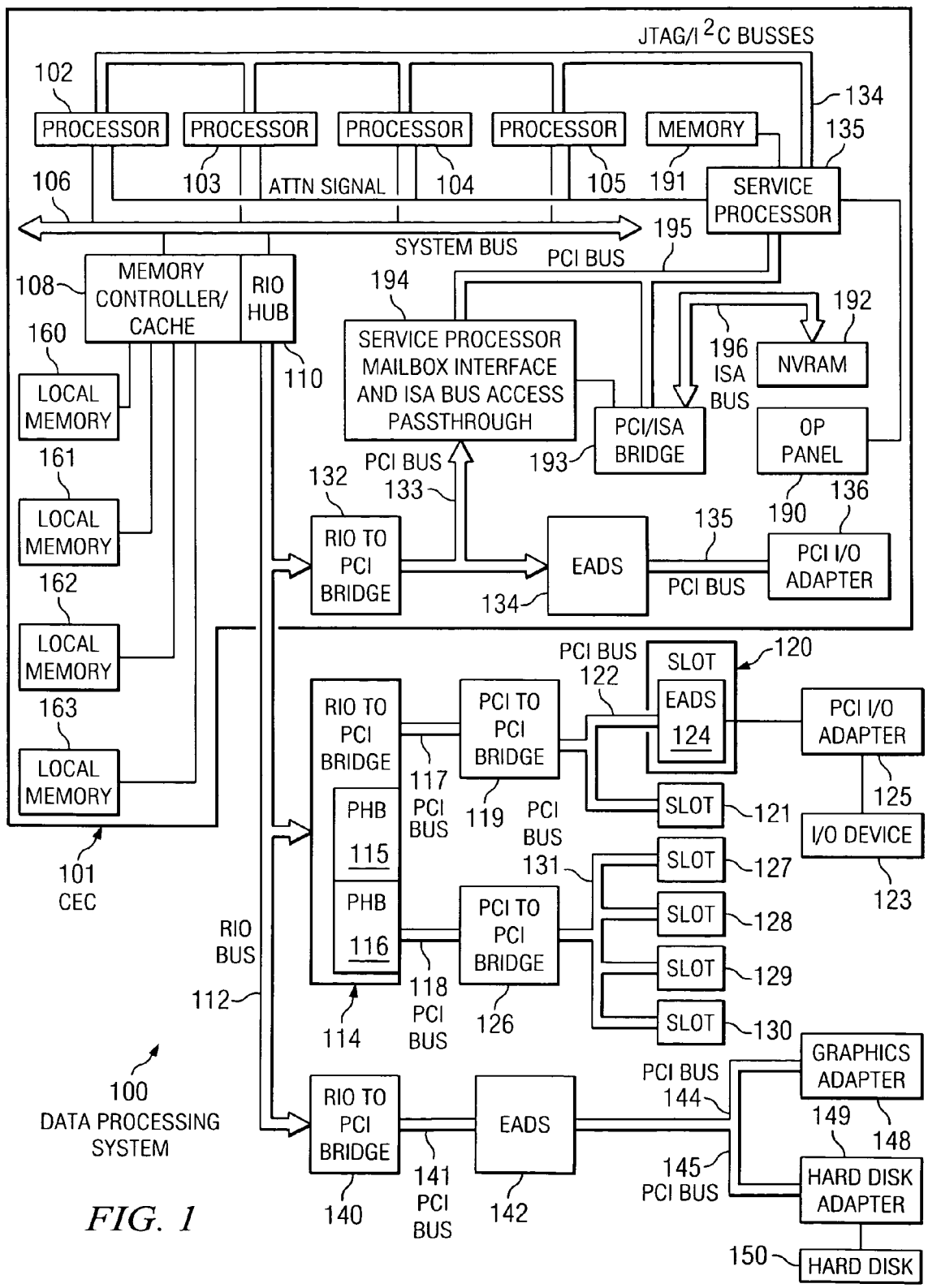
FIG. 1 is a block diagram of a data processing system in which the present invention may be implemented in accordance with the present invention.

A preferred embodiment of the present invention and its advantages are better understood by referring to the figures, like numerals being used for like and corresponding parts of the accompanying figures.

The present invention is a method, system, and computer program product for determining the efficiency of detecting defects in code. The efficiency is determined by comparing the actual time when a defect is found to an estimated time when the defect entered the code.

Several different methods are provided for estimating the time when a defect entered code. All methods use a repository that is capable of tracking code changes and development steps as well as defect discovery and defect fixes. The repository is capable of maintaining associations among these tracked code changes, development steps, defect discovery, and defect fixes. The term code development as used herein includes code design as well as code testing steps.

The term "repository" as used herein refers to a device that stores code being developed including information about the design, development, and testing of the code. This repository is capable of tracking design, development, and testing steps, as well as all artifacts related to these steps including defects and code changes even while the code is being developed. The term "repository" will be understood to mean a single repository, a set of cooperating repositories, or repository-like tools. The repository is endowed with the ability to keep records with timestamps of artifacts and changes thereto and to maintain associations between the artifacts and software engineering steps described above. The repository described herein is an integrated tool that tracks the processes described above and keeps artifacts associated. For example, a version of a file may have associations with features or defects so that datamining operations can be performed on these associations.

The term "artifact" herein means an entity such as a piece of textual content having some special significance attached to it, as opposed to an event or a period of time. For instance, a version of a file is an artifact, as is a file, a defect, and a feature. Traditionally, repositories were only used to store code and changes in code. The present invention uses a repository concept wherein code changes are just artifacts like defects. Thus, the code changes and defects are stored in the same place and allow users to link them together to create cause and dependency associations.

A first method uses an association explicitly created in the repository between features and defect tracking. A feature is a description of the objective of one or more files being developed. Features may be entered into the repository. The time a feature is entered is kept in the repository. When a defect report is opened in the repository, a time is determined. This time is the time the defect is said to have been discovered. A determination is made that the defect is associated with a particular feature. This association between the defect and a feature may be used to estimate when a defect entered the code. The estimated time the defect entered the code is said to be the time the feature was stored in the repository. Thus, for the first method, the difference between the time the feature was stored in the repository and the time a defect report was opened is the time it took to discover the defect.

A second method for determining defect detection efficiency does not require an explicit association between a defect and a feature. The second method does not require the tracking of features. This method permits a determination of the estimated time the defect could have been discovered without looking at features. Instead, this method estimates the time a defect entered the code by estimating that it entered when the most recent version of a file that had to be fixed to correct the defect was created before the defect was discovered. The second method provides for opening a defect report once the defect is discovered. Again, the time this defect report is opened is said to be the actual time of discovery of the defect. A fix is then stored in the repository. The time this fix was stored is also maintained in the repository. A fix is a collection of one or more files that correct the defect. The second method determines a list of files that had to be changed in order to fix the defect. For each file in this list, a determination is made as to the most recent version of the file that was created before the defect was discovered. A list of these most recent versions is created. A determination is then made as to when the earliest file in the list was created. The time this earliest file was created is the estimated time the defect could have been discovered. A comparison is made between the actual discovery of the defect and the estimated time the defect entered the code. This comparison is used to evaluate the efficiency of the test team.

The third method requires tracking of features. The third method provides for opening a defect report once the defect is discovered. Again, the time this defect report is opened is said to be the actual time of discovery of the defect. A fix is then stored in the repository. The time this fix was stored is also maintained in the repository. The third method determines a list of files that had to be changed in order to fix the defect. A determination is made as to what feature or features each file in this list is associated with. A list of these features is created. A determination is then made as to when the earliest feature in the list was created. The time this earliest feature was created is the estimated time the defect could have been discovered. A comparison is made between the actual discovery of the defect and the estimated time the defect entered the code. This comparison is used to evaluate the efficiency of the test team.

The efficiency of a test team may be used for billing purposes. Traditionally, testing teams have tended to bill for services in proportion to the time for which a certain number of testers are hired by a customer. This is not an optimal billing strategy from the customer's point of view of because not all testers are needed at all times. There may be too few testers to handle the loads during peak testing periods, and the cost of fixing a defect rises exponentially with the time a defect remains in the code. The present invention may be used to bill a customer based on the amount of time it takes to detect defects. A billing tool may use the present invention to estimate the effectiveness of a test team by performing data mining on a repository that tracks code development steps as well as defect correction. The estimate is made by comparing the time of actual discovery of the defect to an estimated time when the defect could have been discovered.

FIG. 1 depicts a block diagram of a data processing system in which the present invention may be implemented in accordance with the present invention. Data processing system 100 may be a symmetric multiprocessor (SMP) system including a plurality of processors 102, 103, 104, and 105 connected to system bus 106. For example, data processing system 100 may be an IBM RS/6000, a product of International Business Machines Corporation in Armonk, N.Y. Data processing system 100 includes a central electronic complex 101 which includes logically partitioned hardware. CEC 101 includes a plurality of processors 102, 103, 104, and 105 connected to system bus 106. Alternatively, a single processor system may be employed. Also connected to system bus 106 is memory controller/cache 108, which provides an interface to a plurality of local memories 160-163. RIO Hub 110 is connected to system bus 106 and provides an interface to RIO bus 112. Memory controller/cache 108 and RIO Hub 110 may be integrated as depicted.

The repository of the present invention may be stored in memory 108, hard disk 150, or any other type of storage device. Files are stored in the repository. A date and time stamp are also stored along with each file. In addition, the repository permits associations to be made between files, events such as defect detection, and/or development steps such as the storage of a fix for a defect. For example, features are also stored in the repository. A feature is a description of the objective of particular flies. One or more files may then be explicitly associated with a feature to create an association between the file and the feature.

In addition to the above, the repository tracks defect detection and correction. When a defect is discovered, a report is opened in the repository. This report is also date and time stamped. As files are corrected to fix the defect, the correction of these files are tracked. Thus, the repository includes data regarding when a defect is actually detected, what files had to be repaired in order to fix the defect, and when all of these events took place.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI slots, to which PCI I/O adapters may be coupled, such as slots 120, 121, and 127-130, graphics adapter 148, and hard disk adapter 149 may each be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of slots 120, 121, and 127-130, graphics adapter 148, hard disk adapter 149, each of host processors 102-105, and each of local memories 160-163 is assigned to one of the three partitions. For example, processor 102, local memory 160, and slots 120, 127, and 129 may be assigned to logical partition P1; processors 103-104, local memory 161, and slot 121 may be assigned to partition P2; and processor 105, local memories 162-163, slots 128 and 130, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance, also called an image, of the AIX operating system may be executing within partition P2, and a Windows 2000, operating system may be operating within logical partition P3. Windows 2000, is a product and trademark of Microsoft Corporation of Redmond, Wash.

RIO to PCI bridge 114 is connected to RIO bus 112 and provides an interface to PCI bus 117 and PCI bus 118. RIO to PCI bridge 114 includes one or more PCI host bridges (PHB), such as PHB 115 and PHB 116. Each PHB is coupled to a PCI to PCI bridge through a PCI bus. For example, PHB 115 is coupled to PCI to PCI bridge 119 through PCI bus 117. PHB 116 is coupled to PCI to PCI bridge 126 through PCI bus 118. Each PCI to PCI bridge is coupled to one or more PCI slots. For example, PCI to PCI bridge 119 is coupled to slot 120 and slot 121 using PCI bus 122. Although only two slots are shown, typically either four or eight slots are supported by each PHB. PCI to PCI bridge 126 is coupled to slots 127-130 using PCI bus 131.

Each slot includes an EADS chip to which a PCI I/O adapter may be attached. For example, slot 120 includes EADS 124. An I/O adapter may be inserted into a slot and thus coupled to an EADS. For example, I/O adapter 125 is inserted into slot 120 and coupled to EADS 124. An I/O device may be coupled to data processing system 100 utilizing an I/O adapter. For example, as depicted, I/O device 123 is coupled to I/O adapter 125.

A memory mapped graphics adapter 148 may be connected to RIO bus 112 through PCI bus 144, EADS 142, PCI bus 141, and RIO to PCI bridge 140. A hard disk 150 may be coupled to hard disk adapter 149 which is connected to PCI bus 145. In turn, this bus is connected to EADS 142, which is connected to RIO to PCI Bridge 140 by PCI bus 141.

An RIO to PCI bridge 132 provides an interface for a PCI bus 133 to connect to RIO bus 112. PCI I/O adapter 136 is connected to EADS 134 by PCI bus 135. EADS 132 is connected to PCI bus 133. This PCI bus also connects RIO to PCI bridge 132 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 102-105 via a plurality of JTAG/I²C busses 134. JTAG/I²C busses 134 are a combination of JTAG/scan busses (see IEEE 1149.1) and Phillips I²C busses. However, alternatively, JTAG/I²C busses 134 may be replaced by only Phillips I²C busses or only JTAG/scan busses. All SP-ATTN signals of the host processors 102, 103, 104, and 105 are connected together to an interrupt input signal of the service processor. The service processor 135 has its own local memory 191, and has access to the hardware OP-panel 190.

Data processing system 100 may be implemented using various commercially available computer systems. For example, data processing system 100 may be implemented using IBM eServer iSeries Model 840, system available from International Business Machines Corporation. Such a system may support logical partitioning using an OS/400, operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
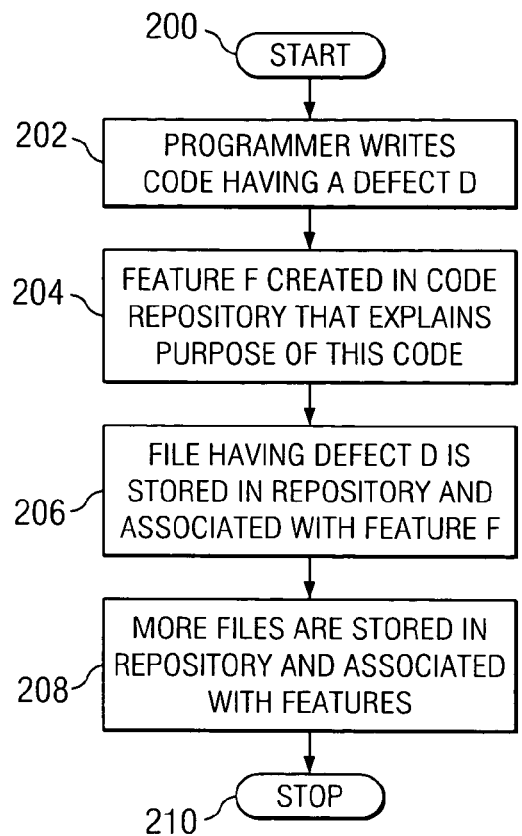
FIG. 2 illustrates a high level flow chart that depicts tracking code development and development events using a repository in accordance with the present invention.

FIG. 2 illustrates a high level flow chart that depicts tracking code development and development events using a repository in accordance with the present invention. The process starts as depicted by block 200 and thereafter passes to block 202 which illustrates a programmer developing code. The programmer writes code that inadvertently, and presently unknown to the programmer, includes a defect D. Next, block 204 depicts a feature F being created in a code repository. Feature F explains the purpose of the code currently being developed by the programmer. Block 206, then, illustrates a file having defect D being stored in the repository and associated with feature F. Thus, the file is associated with feature F in order to indicate that the file is included in the code to provide feature F. In this manner, an explicit association is created between the file and feature F. Next, block 208 depicts additional files being stored in the repository and associated with the various features. The process then terminates as illustrated by block 210.

Figure 3:
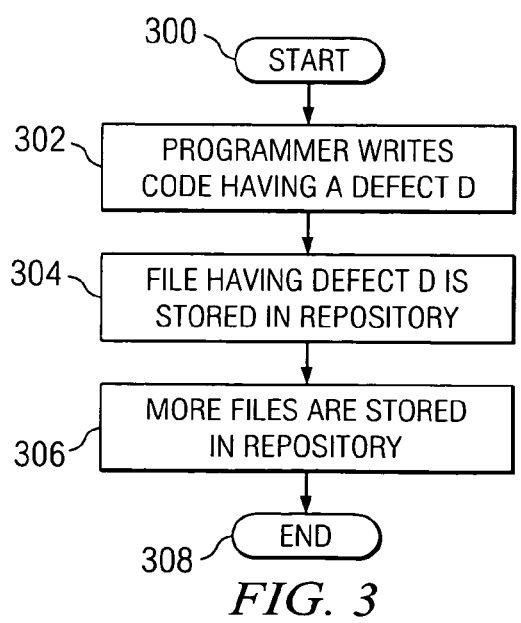
FIG. 3 depicts a high level flow chart that depicts tracking code development using a repository in accordance with the present invention.

FIG. 3 depicts a high level flow chart that depicts tracking code development using a repository in accordance with the present invention. The process starts as depicted by block 300 and thereafter passes to block 302 which illustrates a programmer developing code. The programmer writes code that inadvertently, and presently unknown to the programmer, includes a defect D. Next, block 304 depicts a file having defect D being stored in the repository. Next, block 306 depicts additional files being stored in the repository and associated with the various features. The process then terminates as illustrated by block 308.

Figure 4:
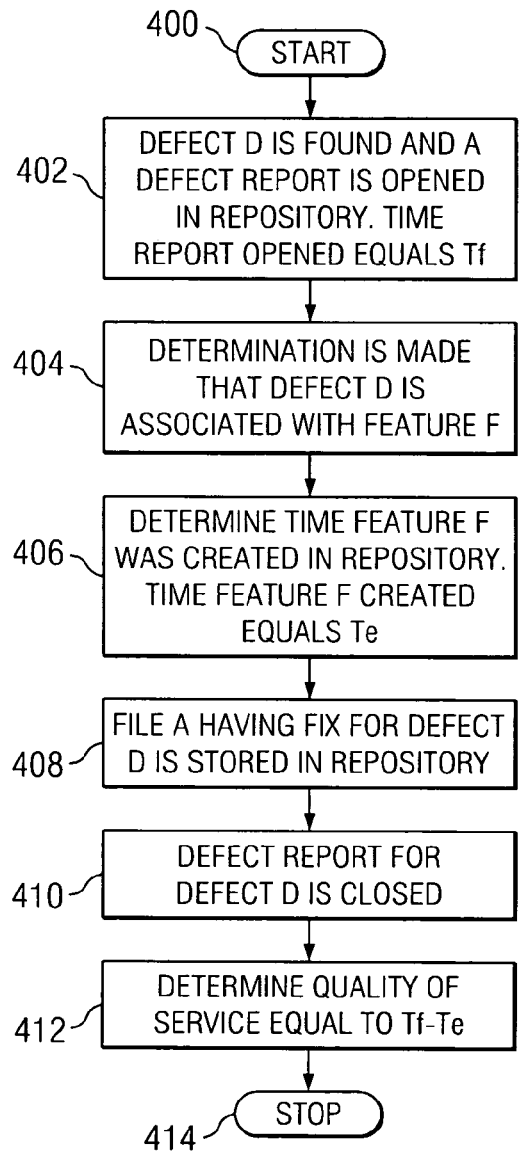
FIG. 4 illustrates a high level flow chart that depicts determining defect detection efficiency by analyzing associations created explicitly in a repository between code development steps and events in accordance with the present invention.

FIG. 4 illustrates a high level flow chart that depicts determining defect detection efficiency by analyzing associations created explicitly in a repository between code development steps and events in accordance with the present invention. The process starts as depicted by block 400 and thereafter passes to block 402 which illustrates a defect D being found. A defect report is opened in the repository. The time the defect report is opened is equal to time Tf. Next, block 404 depicts a determination being made that defect D is associated with a feature F.

The process then passes to block 406 which illustrates a determination of the time when feature F was entered into the repository. The time feature F was created in the repository is equal to time Te. Thereafter, block 408 depicts a file A having a fix for defect D being stored in the repository.

Block 410, then, illustrates a defect report for defect D being closed in the repository. Thereafter, block 412 depicts a determination of the quality of service by determining an efficiency of defect detection. The defect detection efficiency is equal to the difference between the estimated time when the defect entered the code and the time the defect was actually discovered. For the process depicted by FIG. 4, the earliest point in time when the defect could have been discovered is the time the feature associated with the file that had the defect is created in the repository. Thus, the quality of service is Tf-Te. The process then terminates as illustrated by block 414.

Figure 5:
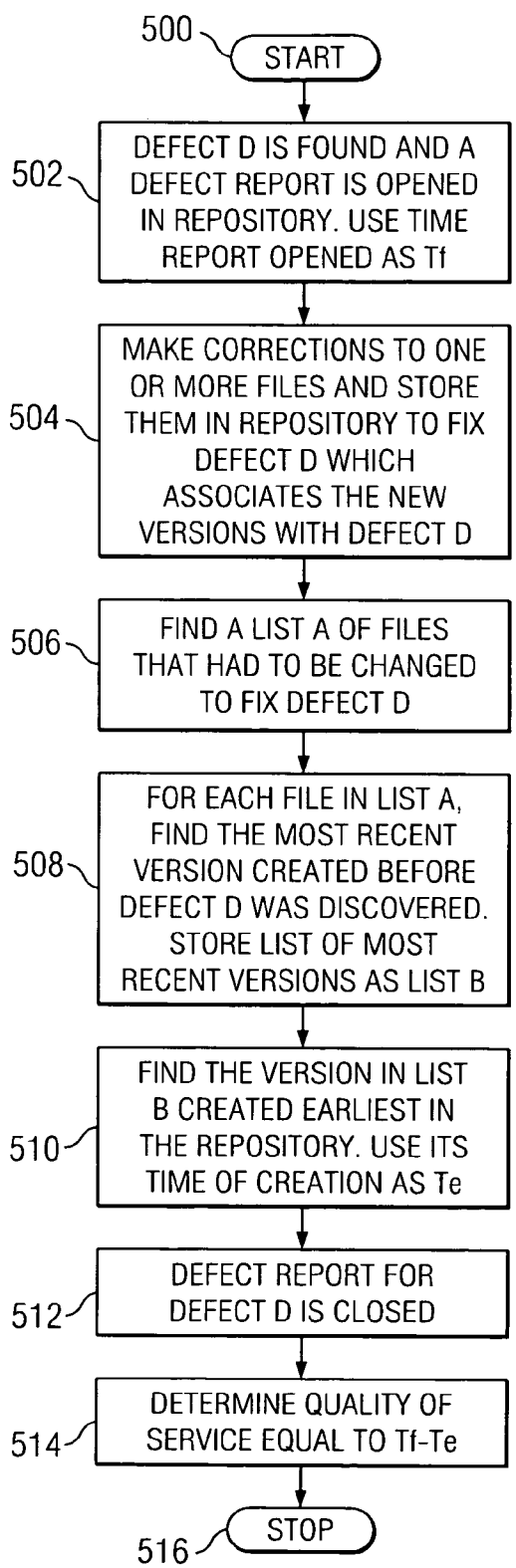
FIG. 5 depicts a high level flow chart that illustrates determining defect detection efficiency by analyzing code development steps tracked by a repository and fixes taken to correct a defect in accordance with the present invention.

FIG. 5 depicts a high level flow chart that illustrates determining defect detection efficiency by analyzing code development steps tracked by a repository and fixes taken to correct a defect in accordance in accordance with the present invention. The process starts as depicted by block 500 and thereafter passes to block 502 which illustrates a defect D being found and a defect report being opened in the repository. The time the defect report is opened is equal to time Tf.

Next, block 504 depicts making corrections to one or more files to fix defect D and storing the corrections in the repository. When the corrections are stored in the repository, they are indicated as fixes to defect D. The process of storing the corrections in the repository as fixes to defect D implicitly associates the new versions of the files with defect D. Thereafter, block 506 illustrates finding a list A of files that had to be changed in order to correct, or fix, defect D.

Next, block 508 depicts for each file in list A, finding the most recent version created before defect D was discovered, i.e. before the defect report was opened. The list of most recent versions is stored as list B. Thereafter, block 510 illustrates finding the version in list B that was created the earliest in the repository. The time of creation in the repository of the version created the earliest is equal to time Te. The process then passes to block 512 which depicts the defect report for defect D being closed. Block 514, then, illustrates a determination of the quality of service by determining the difference between time Tf and time Te. The process then terminates as depicted by block 516.

Figure 6:
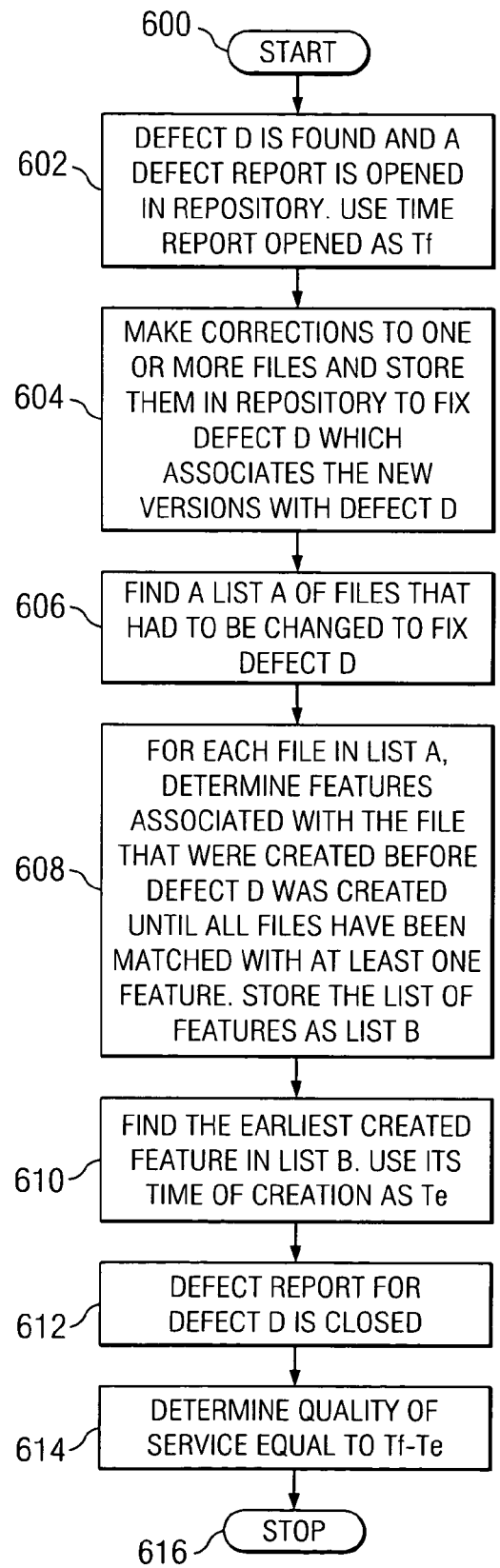
FIG. 6 depicts a high level flow chart that illustrates determining defect detection efficiency by analyzing code development steps and events tracked by a repository and fixes taken to correct a defect in accordance in accordance with the present invention.

FIG. 6 illustrates a high level flow chart that illustrates determining defect detection efficiency by analyzing code development steps tracked by a repository and fixes taken to correct a defect in accordance in accordance with the present invention. The process starts as depicted by block 600 and thereafter passes to block 602 which illustrates a defect D being found and a defect report being opened in the repository. The time the defect report is opened is equal to time Tf.

Next, block 604 depicts making corrections to one or more files to fix defect D and storing the corrections in the repository. When the corrections are stored in the repository, they are indicated as fixes to defect D. The process of storing the corrections in the repository as fixes to defect D implicitly associates the new versions of the files with defect D. Thereafter, block 606 illustrates finding a list A of files that had to be changed in order to correct, or fix, defect D.

Next, block 608 depicts for each file in list A, determining features that are associated with the file that were created before defect D was created until all files have been matched with at least one feature. A list of these features is stored as list B. Thereafter, block 610 illustrates finding the earliest created feature in list B. The time of creation of this feature is used as time Te. The process then passes to block 612 which depicts the defect report for defect D being closed. Block 614, then, illustrates a determination of the quality of service by determining the difference between time Tf and time Te. The process then terminates as depicted by block 616.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for determining an efficiency of a test team, said method comprising the steps of:
   tracking development steps of particular code using a repository while said particular code is being developed, said particular code including a plurality of files, and wherein time stamp information about development of said plurality of files is stored in said repository;
   discovering a defect in said particular code;
   in response to discovering said defect:
      storing an indicator of said discovery in said repository, wherein said repository tracks defect discovery;
      using said indicator to determine an actual first time when said defect was actually discovered; and
   determining that one of said plurality of files includes said defect;
   identifying a feature that is associated with said one of said plurality of files;
   determining a second time when said feature was stored in said repository using said time stamp information; and
   determining an efficiency of said test team by comparing said actual first time with said second time when said feature was stored.

2. A method in a data processing system for determining an efficiency of a test team, said method comprising the steps of:
   tracking development steps of particular code using a repository while said particular code is being developed, said particular code including a plurality of files, and wherein time stamp information about development of said plurality of files is stored in said repository;
   discovering a defect in said particular code;
   in response to discovering said defect:
      storing an indicator of said discovery in said repository, wherein said repository tracks defect discovery;
      using said indicator to determine an actual first time when said defect was actually discovered; and
   making conections to at least one of said plurality of files in order to fix said defect;
   in response to making said corrections, identifying a most recently created version of said at least one of said plurality of files that was created before said defect was discovered;
   determining a second time when said most recently created version of said at least one of said plurality of files that was created before said defect was discovered was stored using said time stamp information; and
   determining an efficiency of said test team by comparing said actual first time with said second time.

* * * * *